(12) United States Patent
Altun et al.

(10) Patent No.: US 11,846,270 B2
(45) Date of Patent: Dec. 19, 2023

(54) CONTROL METHOD AND DEVICE OF A WIND PARK

(71) Applicant: Siemens Gamesa Renewable Energy A/S, Brande (DK)

(72) Inventors: Safak Burak Altun, Åbyhøj (DK); Pieter M. O. Gebraad, København (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/917,383

(22) PCT Filed: Apr. 9, 2021

(86) PCT No.: PCT/EP2021/059269
§ 371 (c)(1),
(2) Date: Oct. 6, 2022

(87) PCT Pub. No.: WO2021/209330
PCT Pub. Date: Oct. 21, 2021

(65) Prior Publication Data
US 2023/0175490 A1      Jun. 8, 2023

(30) Foreign Application Priority Data
Apr. 15, 2020 (EP) .................................. 20169576

(51) Int. Cl.
*F03D 7/04* (2006.01)
(52) U.S. Cl.
CPC .......... *F03D 7/048* (2013.01); *F05B 2270/32* (2013.01); *F05B 2270/321* (2013.01);
(Continued)

(58) Field of Classification Search
CPC .................. F03D 7/048; F05B 2270/32; F05B 2270/321; F05B 2270/327; F05B 2270/328; F05B 2270/329
See application file for complete search history.

(56) References Cited

U.S. PATENT DOCUMENTS

| 10,539,116 | B2 * | 1/2020 | Davoust | .................. | G01S 17/95 |
| 10,774,811 | B2 * | 9/2020 | Davoust | .................. | F03D 17/00 |
| (Continued) | | | | | |

FOREIGN PATENT DOCUMENTS

| CN | 108708825 A | 10/2018 |
| EP | 3047143 A1 | 7/2016 |
| (Continued) | | |

OTHER PUBLICATIONS

Bleeg et al., Wind Farm Blockage and the Consequences of Neglecting Its Impact on Energy Production; Published: Jun. 20, 2018, Energies 2018, 11(6), 1609; https://doi.org/10.3390/en11061609.
(Continued)

*Primary Examiner* — Eldon T Brockman
(74) *Attorney, Agent, or Firm* — Schmeiser, Olsen & Watts LLP

(57) ABSTRACT

A method of controlling a plurality of wind turbines of a wind park includes: determining an axial induction zone of at least a wind turbine of the wind park; and modifying the axial induction zone for controlling wind farm blockage by adjusting at least one of the following operational variables: a yaw angle of a blade rotor of the wind turbine, a pitch offset angle of at least one blade of the blade rotor, a rotor speed of the blade rotor.

7 Claims, 3 Drawing Sheets

Figure 1:
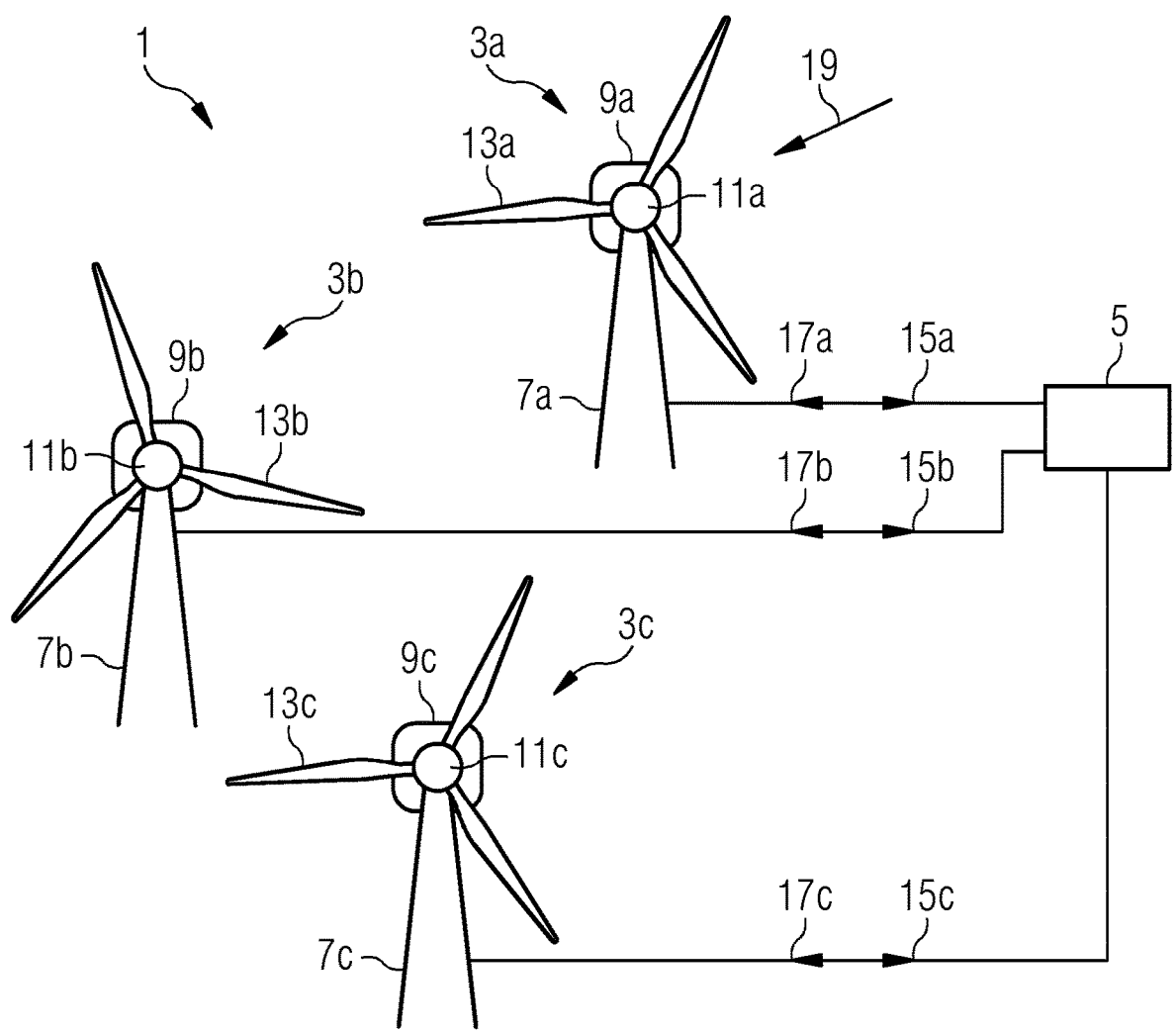

(52) U.S. Cl.
CPC ... *F05B 2270/327* (2013.01); *F05B 2270/328* (2013.01); *F05B 2270/329* (2013.01)

(56) References Cited

U.S. PATENT DOCUMENTS

| | | | |
|---|---|---|---|
| 11,668,284 B2 * | 6/2023 | Nguyen | F03D 7/04 |
| | | | 416/1 |
| 2013/0300115 A1 | 11/2013 | Seem et al. | |
| 2019/0338755 A1 * | 11/2019 | Davoust | F03D 7/046 |
| 2020/0149512 A1 * | 5/2020 | Nguyen | G01P 5/26 |

FOREIGN PATENT DOCUMENTS

| | | |
|---|---|---|
| EP | 3438448 A1 | 2/2019 |
| EP | 3536948 A1 | 9/2019 |

OTHER PUBLICATIONS

Smiley, Eric et al: "Characterization of wind velocities in the upstream induction zone of a wind turbine using scanning continuous-wave lidars"; Journal of Renewable and Sustainable Energy; vol. 8; No. 1; Jan. 1, 2016 (Jan. 1, 2016); p. 013301; XP055611027.
ISR; Applicant's file reference: 2020P02934WO, Date of Mailing: Jun. 23, 2021, International application No. PCT/EP2021/059269, International filing Date: Apr. 9, 2021, 15 pages.

* cited by examiner

CONTROL METHOD AND DEVICE OF A WIND PARK

CROSS-REFERENCE TO RELATED APPLICATIONS

This application claims priority to PCT Application No. PCT/EP2021/059269, having a filing date of Apr. 9, 2021, which claims priority to EP Application No. 20169576.4, having a filing date of Apr. 15, 2020, the entire contents both of which are hereby incorporated by reference.

FIELD OF TECHNOLOGY

The following relates to a control method and device for controlling the power production and the structural loads in a wind park, wherein in particular wind farm blockage is to be considered. Further, the following relates to a wind park comprising the above-mentioned control device.

BACKGROUND

A wind park comprises a plurality of wind turbines which extract energy from the wind and convert the energy to electric energy. Due to the extraction of the energy by the rotating rotor blades, the wind stream is affected and modified upstream and downstream of a considered wind turbine. In particular, downstream of an operating wind turbine there is a wake region generated due to the interaction with the rotor blades of the upstream wind turbine in which the wind speed is reduced and in which in general the wind condition is altered compared to a wind condition upstream the considered wind turbine. In general, downstream wind turbines may be subjected to lower wind speed than the upstream wind turbines. Further, upstream of an operating wind turbine there is an axial induction zone, i.e. the area in front of the wind turbine rotor where the flow slows down. The combination of the axial induction zones of each turbine may cause wind farm blockage, which is the slowing down of the wind flow in front of the wind farm. This may reduce the electrical power production of the wind farm itself relative to the available power in the free-stream inflow (far upstream). The blockage may be increased through the combination of several induction zones, which causes that wind turbines in a wind farm may produce less than they would in isolation. This may combine with the wake effects, but it may also be present in cases where the wind turbines are disposed in a front row so that they are not affected by wakes from other turbines.

Method and control devices for controlling the power production and the structural loads in a wind park, which considers axial induction factors, are shown CN 108 708 825 A, EP 3 0471 43 A1, US 2013/300115 A1 and EP 3 438 448 A1. Axial induction factors may not provide a complete description of axial inductions zone and of the phenomena associated therewith.

Thus, there may be a need for a method and a control device for controlling the power production and the structural loads in a wind park, wherein a performance goal may be achieved in a reliable manner, in particular appropriately taking into account axial induction zones between different wind turbines, in order to in particular optimize wind farm power output and/or to avoid wind farm blockage.

SUMMARY

According to an embodiment of the present invention it is provided a method of controlling a plurality of wind turbines of a wind park, the method comprising:

determining an axial induction zone of at least a wind turbine of the wind park, wherein the axial induction zone is determined based on at least one of the following input parameters:
inflow wind direction,
inflow wind speed, and
inflow wind turbulence; and
modifying the axial induction zone for controlling wind farm blockage by adjusting at least one of the following operational variables:
a yaw angle of a blade rotor of the wind turbine,
a pitch offset angle of at least one blade of the blade rotor,
a rotor speed of the blade rotor.

The method may be performed by individual wind turbine control device and/or by a wind park control device, such as a park pilot. The control setting may in particular be characterized by a setting of one or more values of one or more of the operational parameters.

The control setting of the at least one wind turbine or all control settings of all wind turbines may in particular be set such that a performance goal is achieved, for example optimizing or maximizing power output and/or keeping the structural load, to which the individual wind turbines are subjected, to within acceptable limits.

According to an embodiment of the present invention, the operational variable is derived, such that wind park performance is optimized in terms of power production and/or structural load on at least one, in particular all, wind turbines of the wind park. The joint blockage effect distributes the loads unequally over the different turbines in the wind park. For example, turbines towards the edges of a front row may be loaded more than turbines in the middle of the front row, as a result of blockage. It might therefore be beneficial to manipulate the operational variables such that it reduces structural loads on certain turbines (redistributing the loads more equally, for example) by controlling the blockage.

The free-stream (or inflow) wind is considered to comprise the wind which comes into the wind turbine, but which is not affected (e.g., not altered) by any other wind turbine, in particular not affected by any wind turbine rotor forces. Free-stream wind may be understood as a wind which is not affected by any wake of any upstream turbines. Thus, the free-stream wind may be considered to be the wind (for example characterized by wind speed, wind direction and/or wind turbulence) which would impact on a considered wind turbine when no other wind turbine (upstream therefrom for example) affects or modifies or alters the wind characteristics. The free-stream wind turbulence may be considered as a turbulence of the free-stream wind, thus as the turbulence of the wind impacting on the considered wind turbine unaltered by any other wind turbine potentially upstream of the considered wind turbine.

Embodiments of the present invention considers free-stream wind direction and/or free-stream wind speed and/or free-stream wind turbulence for determining the control setting.

Free-stream wind (speed, direction and/or turbulence) may for example be measured and/or determined (e.g., involving computation) from operational parameters of a front turbine in a wind farm, i.e. a turbine which faces the wind unaffected by other wind turbines, e.g. without being any other wind turbines upstream therefrom. The free-stream wind turbulence may be (for example indirectly) measured or may be based on a measured quantity and/or may be based on computations for example at least taking into account operational characteristics of the considered wind turbine or one or more other wind turbines of the wind park. The free-stream wind turbulence may be based on a variance of the free-stream wind speed, for example. The free-stream wind turbulence may also consider a variance or a change of the free-stream wind direction and/or free-stream wind speed.

Deriving the control setting (or all control settings of all wind turbines of the wind park) may involve computations, in particular applying a physical/mathematical model modelling or simulating all wind turbines of the wind park including wake interactions between different wind turbines. The control setting may include a definition of a set of values of one or more operational parameters of the considered wind turbine.

The turbulence of the inflow (i.e., the free-stream wind turbulence) may be relevant, because it may determine to which extent the axial induction zones (upstream a particular wind turbine) will mix with the surrounding flow and recover to the free-stream wind conditions. The free-stream wind turbulence may be a complex phenomenon that in general may be hard to characterize. For simplification therefore, the wind inflow turbulence may be approximated or taken to be the variance of the free-stream wind speed.

The axial induction zones may be a zone upstream a considered wind turbine in which region the wind flow may be affected by rotor forces or may be affected by the operation of the upstream wind turbine.

Determining or deriving the control setting may involve an offline model-based optimization. In particular, a set of optimized control settings may be pre-generated for each wind condition using a model that describes a system behaviour in each (free-stream wind) condition, before live operation with these optimized settings is performed. The model may be used to test different control settings and predict system behaviour. For example, through iteration and other type of optimization algorithms, the optimized settings giving the optimized system behaviour (for example giving optimized power output) may be found. The optimized settings for each condition may be stored in a table or in any other data structure in an electronic storage for example. In a live operation, the data structure having the pre-generated set of optimized control settings associated with different wind conditions may be looked up for that control setting being associated with the current wind condition. Possibly an interpolation between settings or conditions stored in the table may be performed to derive the control settings for the current (wind) condition.

Embodiments of the present invention may optimally schedule the control signal in order to improve wind farm performance (for example increased or optimized or maximized power production) by controlling the axial induction zones, in particular the orientation of axial induction zones. The optimal schedule may be determined with a parametric axial induction zone model that describes or takes into account the interaction of different wind turbines.

The axial induction zone model may be adapted (for example using one or more model parameters) to the current wind condition. For the adaptation of the axial induction zone model (in particular defining model parameters), a characterization of the inflow (i.e., the free-stream wind) may be needed. In particular, the turbulence of the free-stream wind may be taken into account in addition to the free-stream wind speed and/or free-stream wind direction. In particular, more inflow/ambient turbulence may increase the mixing of the axial induction zone with the surrounding free-stream flow.

According to an embodiment of the present invention the wind turbulence is estimated by use of the mean over a certain time period and the standard deviation of the estimated free-stream wind speed. E.g. the estimated turbine intensity is calculated as:

$$TurbEst = ((Par1 \cdot \sigma)/MeanWindSpeed) + Par2$$

where $\sigma$ is the standard deviation of the free-stream wind speed, defined as the square root of the variance, and Par1 and Par2 are two tuning parameters; MeanWindSpeed is the mean of the free-stream wind speed.

According to an embodiment of the present invention, the free-stream wind speed is determined based on an operational condition and/or a wind measurement of at least one front wind turbine facing the wind essentially not disturbed by any other wind turbine, in particular using a 3D data table.

Measuring the free-stream wind speed may be difficult directly to be performed at the wind turbine, because the measurements at the wind turbine may be affected by the rotor operation. Thus, it may be advantageous to derive the free-stream wind speed based on operational condition of the wind turbine.

An estimate of the effective wind speed in the inflow (i.e., the free-stream wind speed) may be based on a turbine-specific three-dimensional rotor aerodynamic data table (or any other data structure) with electric power and thrust entries as a function of blade pitch angle and/or rotor rotational speed and/or inflow wind speed. For example, the current power level (for example power production) and blade pitch angle and rotor speed may be used to derive the effective wind speed (i.e., free-stream wind speed) from the table or data structure.

By using the turbine operational condition as a sensor rather than a local anemometer wind speed measurement, the wind speed determination may be less sensitive to small-scale turbulence and flow blockage effects of parts of the wind turbine. In particular, the thereby obtained effective wind speed may be low-path filtered with a large filter time constant (for example 600 s). In other embodiments, the free-stream wind speed may be measured by an upstream or front wind turbine. Furthermore, values for the free-stream wind speed derived by several front wind turbines may be combined, for example averaged.

According to an embodiment of the present invention, the operational condition comprises: current power level; and/or current blade pitch angle of at least one rotor blade; and/or rotational speed of a rotor of the front wind turbine. Thereby, for example, conventionally available equations or models may be utilized to derive the free-stream wind speed. The current power level may relate or may be equal to the current power production or the current power output of the wind turbine.

The free-stream wind direction may be determined using or performing a measurement of the wind direction at the nacelle. In particular, a measurement value of the wind direction may be low-pass filtered with a low-filter time constant (for example 600 s).

It should be understood that features, individually or in any combination, disclosed, described or explained in the context of a method of controlling the power production in a plurality of wind turbines may also be applied, individually or in any combination, to a control device for controlling the power production in a plurality of wind turbines according to an embodiment of the present invention and vice versa.

According to an embodiment of the present invention it is provided a control device for controlling the power production in a plurality of wind turbines of a wind park. The control device comprises a processor adapted to determine an axial induction zone of at least a wind turbine of the wind park, the axial induction zone being determined based on inflow wind direction or an inflow wind speed or an inflow wind turbulence, and generate a control setting of at least one wind turbine of a wind park for modifying the axial induction zone by adjusting at least one of the following operational variables for controlling wind farm blockage:

a yaw angle of a blade rotor of the wind turbine,
a pitch offset angle of at least one blade of the blade rotor,
a rotor speed of the blade rotor.

Furthermore, it is provided a wind park, comprising a plurality of wind turbines and the control device above described, communicatively connected to the wind turbines to supply the respective control setting to each wind turbine.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
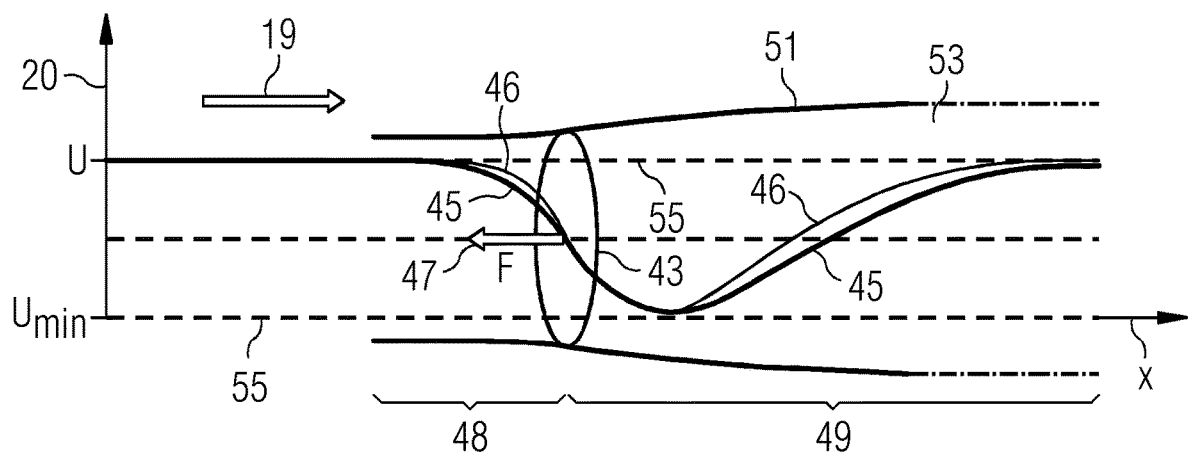
Figure 3:
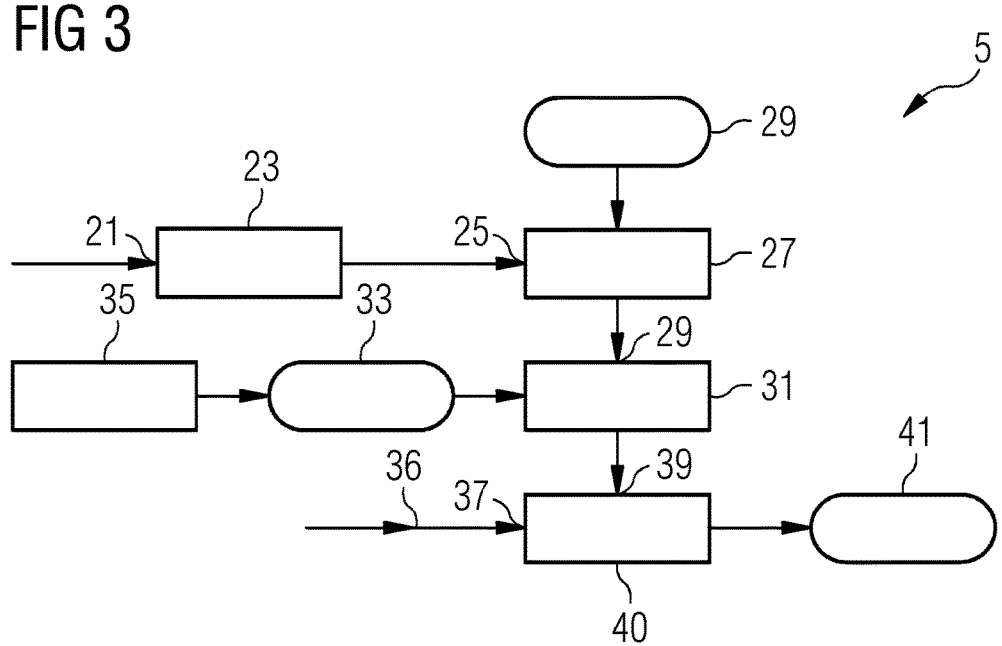
Figure 4:
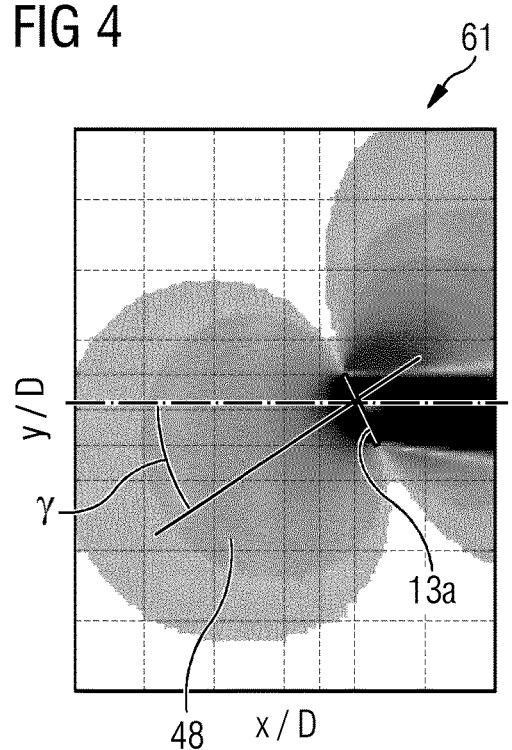
Figure 5:
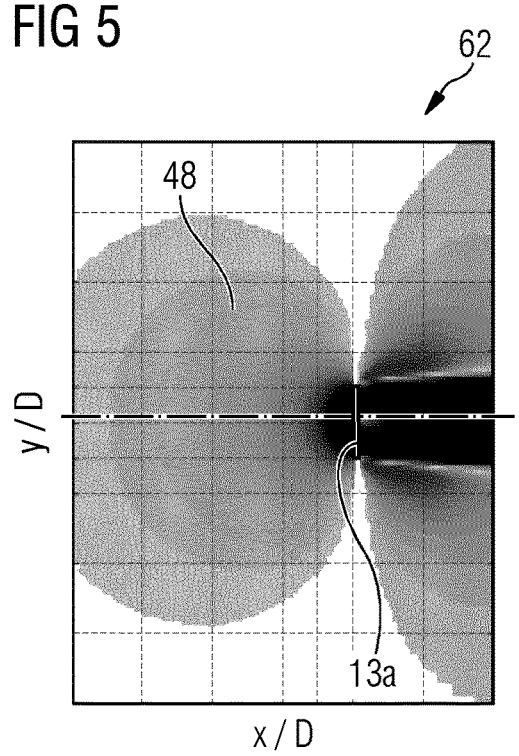
Figure 6:
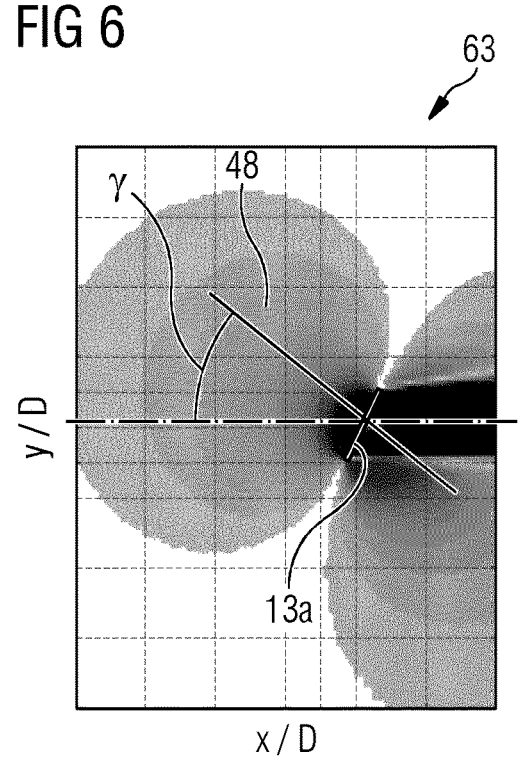

Some of the embodiments will be described in detail, with reference to the following figures, wherein like designations denote like members, wherein:

FIG. 1 schematically illustrates a wind park according to an embodiment of the present invention;

FIG. 2 schematically illustrates wind flow characteristics upstream and downstream a wind turbine creating an axial induction zone;

FIG. 3 schematically illustrates a control device for controlling the power production in a plurality of wind turbines according to an embodiment of the present invention which may be comprised in the wind park illustrated in FIG. 1;

FIG. 4 schematically illustrates the effects of the execution of steps of a method according to an embodiment of the present invention;

FIG. 5 schematically illustrates the effects of the execution of steps of a method according to an embodiment of the present invention; and FIG. 6 schematically illustrates the effects of the execution of steps of a method according to an embodiment of the present invention.

DETAILED DESCRIPTION

The illustration in the drawings is in schematic form.

The wind park 1 schematically illustrated in FIG. 1 comprises plural wind turbines 3a,3b,3c and a control device 5 for determining a control setting of at least one wind turbine of the wind park 1 according to an embodiment of the present invention. Each wind turbine 3a,3b,3c comprises a respective wind turbine tower 7a,7b,7c having mounted on top a respective nacelle 9a,9b,9c which harbours an electric generator having a rotation shaft coupled with a wind rotor 11a, 11b, 11 c. At the wind rotor 11a, 11b, 11c plural respective rotor blades 13a, 13b, 13c are connected which drive the generator for producing electric energy. The wind turbines 3a,3b,3c may further each comprise a converter, in particular AC-DC-AC converter for converting a variable frequency power stream output by the electric generator to a fixed frequency power stream having for example a frequency of 50 Hz or 60 Hz. Each wind turbine may further comprise a wind turbine transformer for transforming an output voltage to a higher medium voltage.

The wind park may comprise more than three wind turbines, for example 20 to 100 wind turbines or even more wind turbines. The method and device of embodiments of the present invention may be applied to only a portion of the wind turbines of a wind park. The wind turbine power output terminals may commonly be connected at a point of common coupling which may supply electric energy (optionally via a wind park transformer) to a not illustrated utility grid. Each wind turbine 3a,3b,3c may comprise a wind turbine controller.

The control device 5 for determining control settings of at least one wind turbine 3a,3b,3c receives measurement signals and/or operational parameters 15a,15b,15c from the respective wind turbines 3a, 3b and 3c and supplies control signals 17a, 17b, 17c to the respective wind turbines 3a, 3b, 3c for controlling the operation of the wind turbines 3a,3b, 3c. In particular, the control signals 17a, 17b, 17c comprise or encode one or more control settings modifying an axial induction zone (as better defined in the following) of the wind turbines 3a, 3b, 3c. The control signals 17a, 17b, 17c permit adjusting at least one of the following operational variables of the wind turbines 3a, 3b, 3c:

a yaw angle $\gamma$ of the blade rotor 11a, 11b, 11c,
a pitch offset angle of the blade 11a, 11b, 11c,
a rotor speed of the blade rotor 13a, 13b, 13c.

Modifying the axial induction zone permits controlling wind farm blockage.

The yawing angle $\gamma$ is an angle between a free-stream wind direction and a direction of the rotation axis of the considered wind turbine 3a,3b,3c. The pitch offset angle is an angle of the blade 11a, 11b, 11c about its respective longitudinal axis, radially oriented with respect to the rotational axis of the blade rotor 13a, 13b, 13c.

The control device 5 derives the respective control settings (supplied via control signals 17a, 17b, 17c) based on an inflow wind direction and/or inflow wind speed, and/or inflow wind turbulence. The control device 5 may determine the inflow wind turbulence for example based on a variance of an inflow wind speed. The inflow wind speed may for example be determined based on an operational condition and/or a wind measurement of at least one front wind turbine, such as wind turbine 3a which is facing the wind indicated with reference sign 19 (e.g., having a particular inflow wind speed, direction and turbulence).

The operational condition and/or the wind measurement of the front turbine 3a may for example be supplied via the signal 15a to the control device 5. The operational condition may in particular comprise the current power level, current blade pitch angle and current rotational speed of the rotor of the front turbine 3a. Based on these values, the control device 5 may then (using one or more tables or relationships or program modules, for example) derive the inflow wind speed for plural successive time points or time intervals. The control device 5 may then calculate the variance of the inflow wind speed to obtain the (estimation of) the inflow wind turbulence.

The control device 5 further provides an implementation of an axial induction zone model having model parameters which may be defined based on for example a measured inflow wind direction, the free-stream wind speed and the inflow wind turbulence. The axial induction zone model may be utilized for deriving the wind turbine control signals 17a, 17b, 17c (individually for the corresponding wind turbine) to derive and supply the wind turbine control signals 17a, 17b, 17c, such as to satisfy a performance goal, such as optimizing power production of the entire wind park 1.

FIG. 2 schematically illustrates wind flow upstream and downstream a wind turbine having rotor blades rotating in a rotor disk 43. Upstream the rotor disk 43, the wind 19 has a free-stream wind velocity U which then varies in dependence of a lateral position x according to a first curve 45 for a first turbulence and according to a second curve 46 for a second turbulence in a coordinate system having as ordinate 20 wind speed and having as abscissa lateral extent x.

Immediately upstream the rotor disk 43 an axial induction zone 48 is defined. The axial induction zone 48 be described as the region where the inflow wind speed decelerates due to the extraction of kinetic energy from the free-stream wind flow.

The rotor disk 43 including the rotating rotor blades exerts a force 47 on the wind 19 resulting in a decrease of the wind velocity 45 downstream the rotor disk 43. The wind velocity 45, 46 reaches downstream the rotor disk 43 a minimum $U_{min}$ and increases then within a wake region 49 substantially towards the upstream wind velocity U. The region 51 defines a shape of the wake 49. Within a mixing region 53, radially outwards of a rotor stream tube 55, mixing of the free-stream wind with the wind affected by the rotor disk 43 occurs.

The shape of the wind velocity 45, 46 downstream a wind turbine is different for different free-stream wind turbulence of the wind 19. In particular, the wind velocity (second curve 46) may be recovered to the upstream value U for a higher (second) free-stream wind turbulence closer to the rotor disk 43 than for a lower (first) turbulence (first curve 45). The wind velocity for the higher second turbulence is indicated with reference sign 46. The wind velocity for the lower second turbulence is indicated with reference sign 45. Thus, taking into account the free-stream wind turbulence may enable to derive optimized control settings for all wind turbines of the wind farm.

FIG. 3 schematically illustrates an embodiment of the control device 5 as an example implementation. As an input, the control device 5 comprises a free-stream wind speed 21 which may for example be based on the operational condition of an upstream wind turbine, such as upstream wind turbine 3a illustrated in FIG. 1. The control device 5 comprises a variance determination module 23 which determines the variance of the free-stream wind speed 21 and performs a scaling, to output a free-stream wind turbulence intensity 25 which is supplied to a turbulence binning module 27. A turbulence bin range definition module 29 supplies turbulent bin ranges to the turbulence binning module 27 which outputs turbulent bin indices 29 which are supplied to a table selection module 31. Within an electronic storage, the control device 5 comprises control settings look-up tables (or other data structures) 33 associating control settings with particular free-stream wind conditions. The control settings look-up tables 33 may have been determined using a an axial induction zone algorithm or determination model 35 which may perform an axial induction zone model-based optimization for each wind condition (in particular offline). The table selection module 31 selects from the plural control settings look-up tables 33 the table corresponding to the current free-stream turbulence intensity 25 and provides therefrom the respective control settings (in particular for each wind turbine 3a, 3b, 3c of the wind farm 1). The output of the table selection module 31 may be a look-up table with the optimized control settings for each wind direction and wind speed of the free-stream wind.

The control device 5 further receives as input the free-stream wind direction 36 and free-stream wind speed 37 for example measured or determined from a front turbine 3a. The optimized control setting may either be taken from the look-up table 39 output by the table selection model 31 or may be interpolated (using interpolation module 40) between two or more tables providing control settings close to the current free-stream wind direction and speed 37. Finally, the control device 5 outputs the optimized wind turbine control settings 41 which may then be supplied, via the control signals 17a, 17b, 17c individually to all wind turbines 3a, 3b, 3c.

Alternatively, to having for each turbulence bin an associated data table with control settings, a full parameterized model may be defined with free-stream turbulence, free-stream wind speed and free-stream wind direction as an input. Thus, a single 3D look-up table may be predefined for the optimized control settings of each wind turbine with the three aforementioned input parameters as selection.

Rather than using a pre-calculated offline model, the model and look-up table could also be adaptive using a learning controller (for example model and control settings look-up table updated online using online parameter fitting based on measurements and online optimization).

FIGS. 4 to 6 schematically illustrate results obtained by means of the method and control device of embodiments of the present invention. Three graphs 61, 62, 63 shows respective shapes of the axial induction zone 48 in front of the blade rotor 13a. Incoming wind flow is from the left of each figure. In the first graph 61, a negative yaw angle γ=−25° relative to the incoming wind flow direction steers the axial induction zone 48 to the right (as seen from upstream of the turbine) with respect to a yaw angle γ=0° (second graph 62). A positive yaw angle γ=25° steers the axial induction zone 48 to the left as seen in the third graph 63 with respect to a yaw angle γ=0° (second graph 62). The axial induction zone 48 shape may be further modified by controlling the wind speed deficit in the axial induction zone 48 through pitch and rotor speed.

By optimally deflecting the axial induction zone 48 of each wind turbine through yaw offsets angles, and/or adjusting (reducing or increasing) the wind speed deficit in the axial induction zone through pitch and rotor speed, the blocking of the flow towards the turbine itself or downstream turbines can be reduced, and more optimal use can be made of the available power in the free-stream inflow to increase the overall wind farm production.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a plurality of wind turbines of a wind park, the method comprising:
   determining an axial induction zone of at least a wind turbine of the wind park, wherein the axial induction zone is determined based on at least one of the following input parameters:
   inflow wind direction,
   inflow wind speed, and
   inflow wind turbulence; and
   modifying the axial induction zone for controlling wind farm blockage by adjusting at least one of the following operational variables:
   a yaw angle of a blade rotor of the wind turbine, a pitch offset angle of at least one blade of the blade rotor,
a rotor speed of the blade rotor.

2. The method according to claim 1, wherein at least one table or function is generated for correlating the input parameters to the operational variables.

3. The method according to claim 2, wherein the at least one table or function optimizes the power production of the wind park by determining a set of operational variables for each set of input parameters.

4. The method according to claim 1, wherein the operational variable is derived, such that the power production of the wind park is optimized.

5. The method according to claim 1, wherein the operational variable is derived, such that the structural loads are optimized on at least one wind turbine of the wind park.

6. A control device controlling a plurality of wind turbines of a wind park, the control device comprising a processor adapted to determine an axial induction zone of at least a wind turbine of the wind park, the axial induction zone being determined based on inflow wind direction or an inflow wind speed or an inflow wind turbulence, and generate a control setting of at least one wind turbine of a wind park for modifying the axial induction zone by adjusting at least one of the following operational variables for controlling wind farm blockage:
a yaw angle of a blade rotor of the wind turbine,
a pitch offset angle of at least one blade of the blade rotor,
a rotor speed of the blade rotor.

7. A wind park, comprising:
a plurality of wind turbines; and
the control device according to claim 6 connected to the wind turbines to supply the respective control setting to each wind turbine.

* * * * *